US011522255B2

(12) United States Patent
Liu et al.

(10) Patent No.: US 11,522,255 B2
(45) Date of Patent: Dec. 6, 2022

(54) BATTERY AND BATTERY PACK HAVING THE SAME, AND ELECTRIC VEHICLE

(71) Applicant: BYD COMPANY LIMITED, Guangdong (CN)

(72) Inventors: Yanchu Liu, Shenzhen (CN); Bin Yao, Shenzhen (CN); Chao Yang, Shenzhen (CN); Xubin Gong, Shenzhen (CN); Yong Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 191 days.

(21) Appl. No.: 16/772,440

(22) PCT Filed: Dec. 13, 2018

(86) PCT No.: PCT/CN2018/120787
§ 371 (c)(1),
(2) Date: Jun. 12, 2020

(87) PCT Pub. No.: WO2019/114780
PCT Pub. Date: Jun. 20, 2019

(65) Prior Publication Data
US 2021/0083256 A1    Mar. 18, 2021

(30) Foreign Application Priority Data
Dec. 14, 2017    (CN) .......................... 201721749386.1

(51) Int. Cl.
*H01M 50/116*    (2021.01)
*H01M 50/531*    (2021.01)
(Continued)

(52) U.S. Cl.
CPC ..... *H01M 50/531* (2021.01); *H01M 10/0525* (2013.01); *H01M 50/10* (2021.01);
(Continued)

(58) Field of Classification Search
CPC ............. H01M 50/531; H01M 50/116; H01M 50/543; H01M 50/172; H01M 50/10; H01M 50/147; H01M 10/0525; H01M 2220/20
See application file for complete search history.

(56) References Cited

U.S. PATENT DOCUMENTS

2006/0073382 A1*    4/2006    Urano ................... H01M 50/15
                                                                    429/174
2007/0105015 A1*    5/2007    Munenaga .......... H01M 50/529
                                                                    429/161
(Continued)

FOREIGN PATENT DOCUMENTS

CN        101662043 A        3/2010
CN        105390741     *    3/2016
(Continued)

OTHER PUBLICATIONS

CN 105390741MT (Year: 2016).*
International Search Report and Written Opinion for Application No. PCT/CN2018/120787, dated Mar. 21, 2019, 9 pages.

*Primary Examiner* — Alexander Usyatinsky

(57) ABSTRACT

A battery (100) and a battery pack having the same, and an electric vehicle are disclosed. The battery (100) includes: a housing; a cover plate (30) located at an end of the housing; a terminal (40) disposed on the cover plate (30); a pole core (10) located inside the housing and having a tab (20), at least one part of the tab (20) being connected to the terminal (40); and an insulating spacer (50) covering one side that is of the at least one part of the tab (20) and that faces away from the terminal (40).

16 Claims, 8 Drawing Sheets

(51) Int. Cl.
    *H01M 50/543*     (2021.01)
    *H01M 50/172*     (2021.01)
    *H01M 50/10*     (2021.01)
    *H01M 50/147*     (2021.01)
    *H01M 10/0525*     (2010.01)

(52) U.S. Cl.
    CPC ....... *H01M 50/116* (2021.01); *H01M 50/147* (2021.01); *H01M 50/172* (2021.01); *H01M 50/543* (2021.01); *H01M 2220/20* (2013.01)

(56) References Cited

U.S. PATENT DOCUMENTS

| | | | | |
|---|---|---|---|---|
| 2012/0070697 | A1* | 3/2012 | Baek | H01M 50/533 |
| | | | | 429/7 |
| 2017/0263983 | A1* | 9/2017 | Bao | H01M 10/0431 |
| 2018/0201143 | A1* | 7/2018 | Lu | B60L 53/30 |
| 2018/0254466 | A1* | 9/2018 | Aikata | H01M 50/538 |

FOREIGN PATENT DOCUMENTS

| | | | |
|---|---|---|---|
| CN | 105390741 A | | 3/2016 |
| CN | 207690902 U | | 8/2018 |
| JP | 2005183332 A | | 7/2005 |
| JP | 2017059508 A | | 3/2017 |
| KR | 20160042244 A | | 4/2016 |
| WO | WO 2016090868 | * | 6/2016 |

\* cited by examiner

BATTERY AND BATTERY PACK HAVING THE SAME, AND ELECTRIC VEHICLE

CROSS-REFERENCE TO RELATED APPLICATIONS

This application is a national phase application of International Patent Application No. PCT/CN2018/120787, filed with the China National Intellectual Property Administration (CNIPA) on Dec. 13, 2018, which is based on and claims priority to and benefits of Chinese Patent Application No. 201721749386.1 filed with the CNIPA on Dec. 14, 2017. The entire contents of the above-identified applications are incorporated herein by reference.

FIELD

The present disclosure relates to the technical field of electric vehicles, and relates to a battery and a battery pack having the same, and an electric vehicle.

BACKGROUND

In the related art, a tab of a lithium-ion battery includes a positive tab and a negative tab, and the positive tab and the negative tab includes a plurality of layers of thin aluminum or copper foil laminates. The tab is relatively soft, and it is easy to deform in an assembly process, resulting in wrinkles and other disadvantages. In a welding process of the tab and a terminal, burrs or welding slag may be generated at a welding position. The usual method is to stick polyethylene terephthalate (PET) tape at the welding position, but there is still a risk of burrs puncturing the tape.

SUMMARY

The present disclosure provides a battery that can effectively prevent deformation or damage of a tab.

A battery, including: a housing; a cover plate located at an end of the housing; a terminal disposed on the cover plate; a pole core located inside the housing and having a tab, at least one part of the tab being connected to the terminal; and an insulating spacer covering one side that is of the at least one part of the tab and that faces away from the terminal.

The present disclosure further provides a battery pack having the above battery.

The present disclosure further provides an electric vehicle having the above battery pack.

The battery according to of the present disclosure can effectively prevent deformation or damage of a tab, is safer and more reliable, and is beneficial to improvement of market competitiveness.

In addition, the battery according to the embodiments of the present disclosure may further have the following additional technical features:

According to the battery in one embodiment of the present disclosure, the tab has a bending portion and a socket formed by the bending portion, at least one part of the insulating spacer being located in the socket.

In some embodiments of the present disclosure, a surface that is of the terminal and that faces the pole core constitutes a mounting plane, and the tab further has a mounting portion connected to the bending portion, the mounting portion being parallel to the mounting plane and connected to the mounting plane, and the insulating spacer covering the mounting portion and an edge of the insulating spacer being located at a junction of the mounting portion and the bending portion.

In some embodiments of the present disclosure, the terminal includes: a plate-like body disposed on a surface that is of the cover plate and that faces the pole core, a surface that is of the plate-like body and that faces the pole core constituting the mounting plane; and a columnar body connected to the plate-like body and passing through the cover plate to protrude from a surface that is of the cover plate and that faces away from the pole core.

In some embodiments of the present disclosure, the plate-like body and the columnar body are an integrated piece; or the plate-like body and the columnar body are separate pieces.

In some embodiments of the present disclosure, the insulating spacer is clamped onto the cover plate.

In some embodiments of the present disclosure, a surface that is of the cover plate and that faces the insulating spacer is provided with a hook, and a surface that is of the insulating spacer and that faces away from the cover plate is provided with a slot, the hook being hooked in the slot from the edge of the insulating spacer.

In some embodiments of the present disclosure, the surface that is of the insulating spacer and that faces away from the cover plate is provided with a reinforcing rib protruding toward the pole core, at least one part of the slot being formed on the reinforcing rib.

In some embodiments of the present disclosure, a surface that is of the insulating spacer and that faces the cover plate is provided with a groove recessed into the inside of the reinforcing rib.

In some embodiments of the present disclosure, the surface that is of the insulating spacer and that faces the cover plate is provided with a first support rib and a second support rib, the first support rib and the second support rib being respectively located on two sides of the tab in a width direction of the tab and both abutting against the cover plate.

In some embodiments of the present disclosure, a protective adhesive layer is provided between the insulating spacer and the at least one part of the tab.

In some embodiments of the present disclosure, a width of the protective adhesive layer is less than a width of the terminal, and a length of the protective adhesive layer is less than a length of the terminal and greater than a width of the tab; and a width of the insulating spacer is less than the width of the terminal, and a length of the insulating spacer is greater than the width of the tab.

In some embodiments of the present disclosure, the cover plate has a first side region and a second side region arranged along a lateral direction of the cover plate, one part of the terminal being located in the first side region and another part being located in the second side region; there is at least one pair of pole cores, and each pair of pole cores includes a first pole core corresponding to a position of the first side region and a second pole core corresponding to a position of the second side region, the first pole core having a first tab, at least one part of the first tab extending in a direction from the first side region to the second side region and being connected to at least the one part of the terminal, the second pole core having a second pole tab, and at least one part of the second tab extending in a direction from the second side region to the first side region and being connected to at least the another part of the terminal; and the insulating spacer covers one side that is of the at least one part of the first tab and that faces away from the terminal and one side that is of the at least one part of the second tab and that faces away from the terminal.

In some embodiments of the present disclosure, the first pole core has two first tabs disposed at intervals along a length direction of the first pole core: a first positive tab and a first negative tab, the second pole core has two second tabs disposed at intervals along a length direction of the second pole core: a second positive tab and a second negative tab, and there are two terminals: a positive terminal and a negative terminal, at least one part of the first positive tab and at least one part of the second positive tab being connected to the positive terminal, and at least one part of the first negative tab and at least one part of the second negative tab being connected to the negative terminal; and there are two insulating spacers: a positive insulating spacer and a negative insulating spacer, the positive insulating spacer covering one side that is of the at least one part of the first positive tab and that faces away from the positive terminal and one side that is of the at least one part of the second positive tab and that faces away from the positive terminal, and the negative insulating spacer covering one side that is of the at least one part of the first negative tab and that faces away from the negative terminal and one side that is of the at least one part of the second negative tab and that faces away from the negative terminal.

In some embodiments of the present disclosure, the positive insulating spacer and the negative insulating spacer are disposed at intervals or extend toward each other to be connected into one piece.

The battery pack according to the embodiments of the present disclosure includes the battery according to the embodiments of the present disclosure.

The electric vehicle according to the embodiments of the present disclosure includes the battery pack according to the embodiments of the present disclosure.

Other aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description made with reference to the following accompanying drawings, where.

REFERENCE NUMERALS

Figure 1:
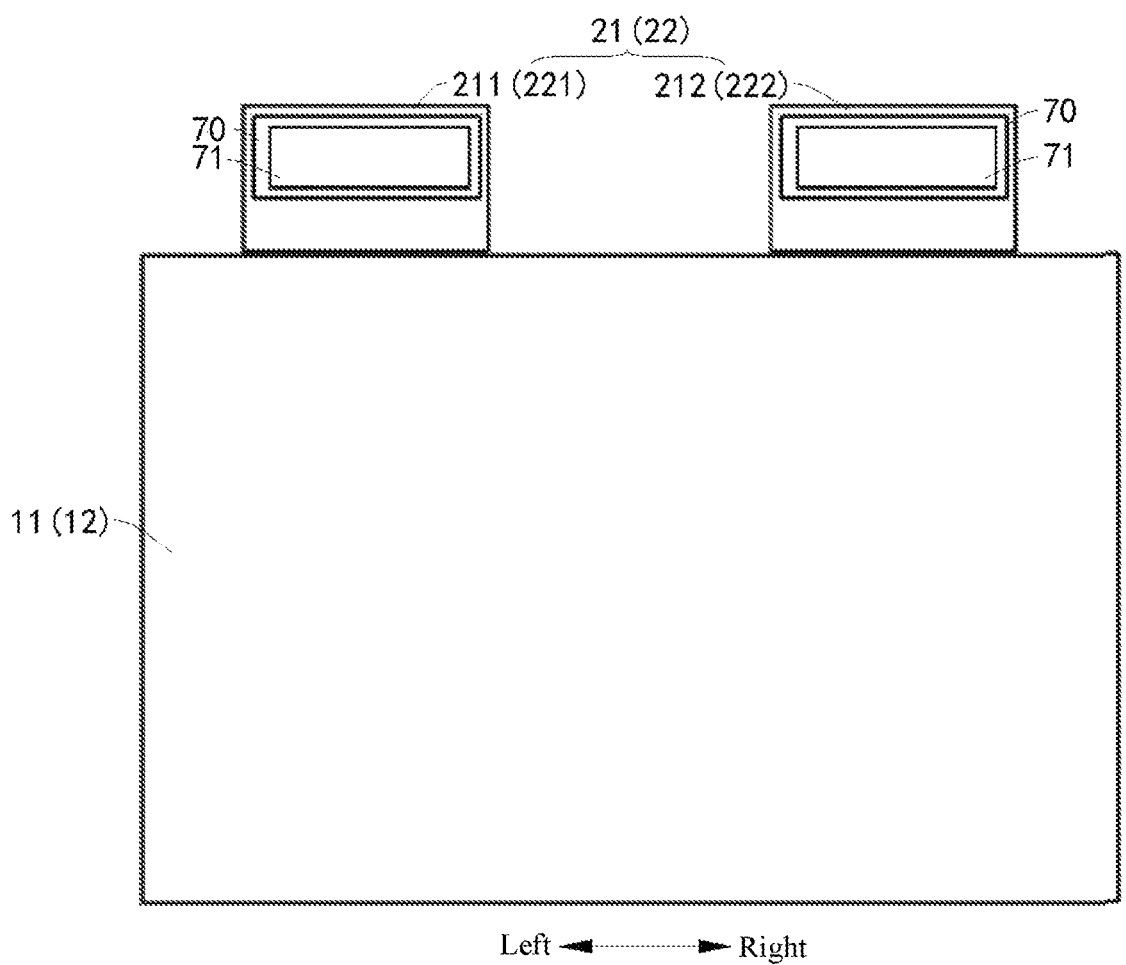
FIG. 1 is a schematic diagram of a connection structure of a pole core and a tab of a battery according to an embodiment of the present disclosure.

Battery 100;
Pole core 10; First pole core 11; Second pole core 12;
Tab 20; Bending portion 201; Mounting portion 202; Socket 203; First tab 21; First positive tab 211; First negative tab 212; Second tab 22; Second positive tab 221; Second negative tab 222;
Cover plate 30; First side region 301; Second side region 302; Hook 31;
Terminal 40; Mounting plane 401; plate-like body 402; columnar body 403; Positive terminal 41; Negative terminal 42;
Insulating spacer 50; Slot 501; Reinforcing rib 502; Groove 503; First support rib 504; Second support rib 505; Positive insulating spacer 51; Negative insulating spacer 52;
Protective adhesive layer 60;
Protective sheet 70; Pre-welding region 71.

DETAILED DESCRIPTION

Embodiments of the present disclosure are described in detail below, and examples of the embodiments are shown in the accompanying drawings. The embodiments described below with reference to the accompanying drawings are exemplary and used for explaining the present disclosure, and should not be construed as a limitation on the present disclosure. Persons of ordinary skill in the art may make various changes, modifications, replacements and variations to the embodiments without departing from the principles and spirit of the present disclosure, and the scope of the present disclosure is as defined by the appended claims and their equivalents.

In the description of the present disclosure, it should be understood that orientation or position relationships indicated by the terms such as "length", "width", "thickness", "top", "bottom", "front", "back", "left", "right", "vertical", and "horizontal" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure. In addition, in the description of the present disclosure, unless otherwise stated, "a plurality of" means two or more than two.

A battery 100 according to the embodiments of the present disclosure is described below with reference to FIG. 1 to FIG. 9.

Referring to FIG. 1 to FIG. 9, the battery 100 according to the embodiments of the present disclosure may include: a housing (not shown in the figure), a pole core 10, a cover plate 30, a terminal 40, and an insulating spacer 50.

In some embodiments, the cover plate 30 is located at an end of the housing, and the cover plate 30 is provided with the terminal 40. The pole core 10 may be located inside the housing. The pole core 10 has a tab 20, and the tab 20 may be connected to the terminal 40 to implement a connection between the tab 20 and the cover plate 30. Herein, the tab 20 may be partially connected to the terminal 40, or the entire tab 20 may be connected to the terminal 40. In other words, at least one part of the tab 20 may be connected to the terminal 40. In addition, the insulating spacer 50 may cover one side of the part that is of the tab 20 connected to the terminal 40 and that faces away from the terminal 40.

It should be noted that the tab 20 and the terminal 40 may be connected by an intermediate connection structure such as a connection sheet, and the connection is firm and reliable. Certainly, the tab 20 and the terminal 40 may also be directly connected, and a connection structure is simpler, so that production costs can be reduced. The direct connection between the tab 20 and the terminal 40 can reduce a number of welding times and simplify an assembly process and can effectively reduce internal resistance of the battery 100. In addition, performance of the battery 100 is better, and safety and service life of the battery 100 can be ensured, which are within the protection scope of the present disclosure.

In the related art, a tab of a lithium-ion battery includes a plurality of layers of thin aluminum or copper foil laminates. The tab is relatively soft, and it is easy to deform in an assembly process, resulting in wrinkles and other disadvantages. In the welding process of the tab and the terminal, burrs or welding slag may be generated at a welding position. The usual method is to stick PET tape at the welding position, but there is still a risk of burrs puncturing the tape.

In the present disclosure, the insulating spacer 50 is covered on one side of the part that is of the tab 20 connected to the terminal 40 and that faces away from the terminal 40. The insulating spacer 50 cooperates with the cover plate 30 to fasten the softer tab 20 and prevent deformation of the tab 20. In addition, the insulating spacer 50 may cover a junction between the tab 20 and the terminal 40 to prevent burrs at the junction from puncturing the tab 20 and other components and affecting performance of the battery 100.

The battery 100 according to the embodiments of the present disclosure includes the insulating spacer 50, and can effectively prevent deformation or damage of the tab 20, is more safe and reliable, and is beneficial to improvement of market competitiveness of the battery 100.

Figure 5:
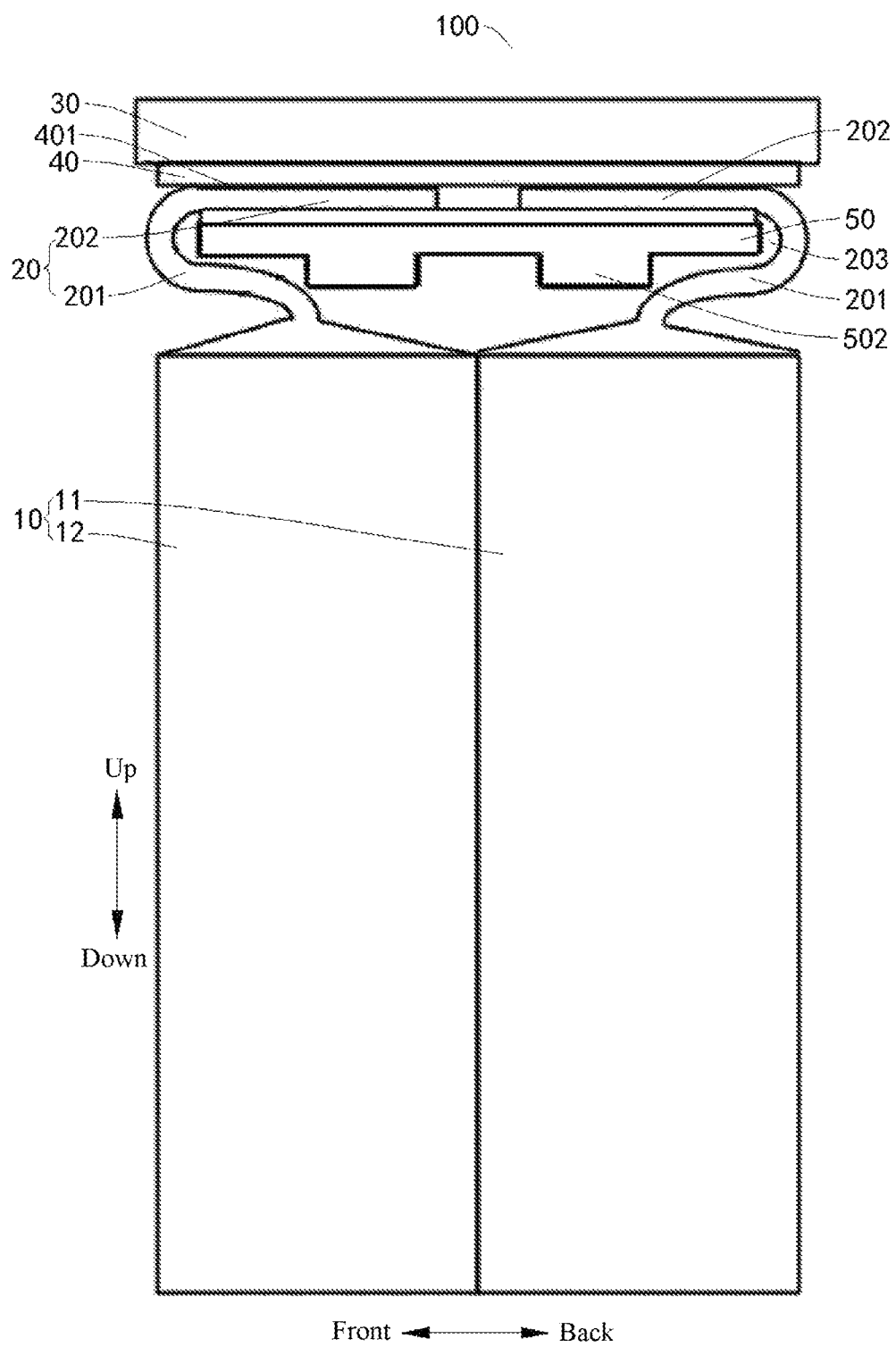
FIG. 5 is a schematic structural diagram of a battery in another state according to an embodiment of the present disclosure.

According to the battery 100 in one embodiment of the present disclosure, as shown in FIG. 5, the tab 20 may be bent to make it easier to connect the tab 20 to the terminal 40. The tab 20 may include a bending portion 201, the bending portion 201 may form a socket 203, and the insulating spacer 50 may be located in the socket 203. Certainly, a part of the insulating spacer 50 may be located in the socket 203, thereby making full use of space, making a structure of the battery 100 more compact, and avoiding wasting of the space.

In some embodiments of the present disclosure, referring to FIG. 5, the tab 20 may further include a mounting portion 202 connected to the bending portion 201, a surface that is of the terminal 40 and that faces the pole core 10 may constitute a mounting plane 401, and the mounting portion 202 may be parallel to the mounting plane 401 and connected to the mounting plane 401. In this way, the connection between the tab 20 and the terminal 40 is implemented, the connection structure is simple and convenient, the tab 20 and the terminal 40 may be connected through surface-to-surface contact, and a connection area is larger, so that the connection between the tab 20 and the terminal 40 is more firm.

In addition, the insulating spacer 50 may cover the mounting portion 202, and an edge of the insulating spacer 50 may be located at a junction of the mounting portion 202 and the bending portion 201, thereby prevent wrinkle deformation or collapse fracture at the junction of the mounting portion 202 and the bending portion 201, and improving structure firmness of the tab 20.

In some embodiments of the present disclosure, as shown in FIG. 5, the tab 20 may be an integrated piece. In other words, the mounting portion 202 and the bending portion 201 may be integrally formed, and the mounting portion 202 and the bending portion 201 of the tab 20 may be integrally wound or laminated by aluminum foil or copper foil. In this way, use of an intermediate connection structure is avoided, internal resistance of the battery 100 is reduced, and there is no need for assembly, thereby reducing production steps, simplifying a processing procedure, and reducing production costs.

During the processing, as shown in FIG. 1 to FIG. 5, the tab 20 may be first wound or laminated by aluminum foil or copper foil to form a flat tab, the flat tab 20 and the terminal 40 are connected, then the insulating spacer 50 is mounted on one side that is of the junction of the tab 20 and the terminal 40 and that faces away from the cover plate 30, and finally the tab 20 is bent. During the bending, the tab 20 may be bent along the edge of the insulating spacer 50 to form the bending portion 201, and the insulating spacer 50 makes a bending procedure simpler and more convenient.

In addition, the edge of the insulating spacer 50 may be formed as an arc edge. Therefore, when the tab 20 is bent to form the mounting portion 202 and the bending portion 201, the arc edge of the insulating spacer 50 can better cooperate with the bending portion 201, so that bending of the tab 20 is convenient, and wrinkle deformation of the tab 20 is prevented.

Figure 8:
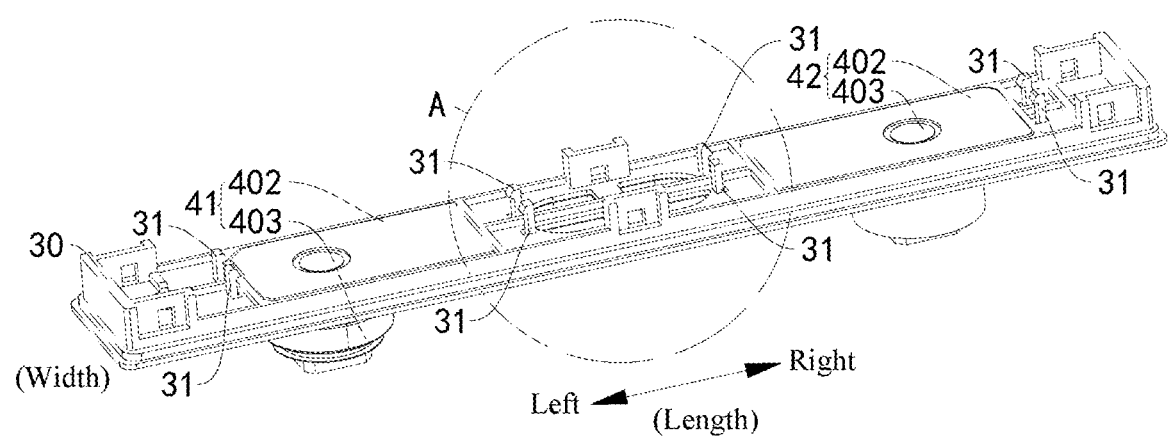
FIG. 8 is a schematic diagram of a connection structure of a cover plate and a terminal of a battery according to an embodiment of the present disclosure.

In some embodiments of the present disclosure, as shown in FIG. 5 and FIG. 8, the terminal 40 may include a plate-like body 402 and a columnar body 403. The plate-like body 402 may be provided on a surface that is of the cover plate 30 and that faces the pole core 10, and a surface that is of the plate-like body 402 and that faces the pole core 10 may constitute the mounting plane 401, thereby facilitating the connection between the terminal 40 and the tab 20. The columnar body 403 may be connected to the plate-like body 402, and the columnar body 403 may pass through the cover plate 30 to protrude from a surface that is of the cover plate 30 and that faces away from the pole core 10. Therefore, the connection between the tab 20 and the cover plate 30 is implemented, and it is convenient for the battery 100 to be applied to other devices and supply power to the other devices.

In some embodiments of the present disclosure, the plate-like body 402 and the columnar body 403 may be an integrated piece or separate pieces in the present disclosure. In the embodiment in which the plate-like body 402 and the columnar body 403 are separate pieces, as shown in FIG. 8, during assembly, the plate-like body 402 may be disposed on one side that is of the cover plate 30 and that faces the pole core 10, one end of the columnar body 403 passes through the cover plate 30 from the side that is of the cover plate 30 and that faces away from the pole core 10, and then one end of the columnar body 403 is connected to the plate-like body 402. A connection manner may be welding, clamping, or the like.

Figure 4:
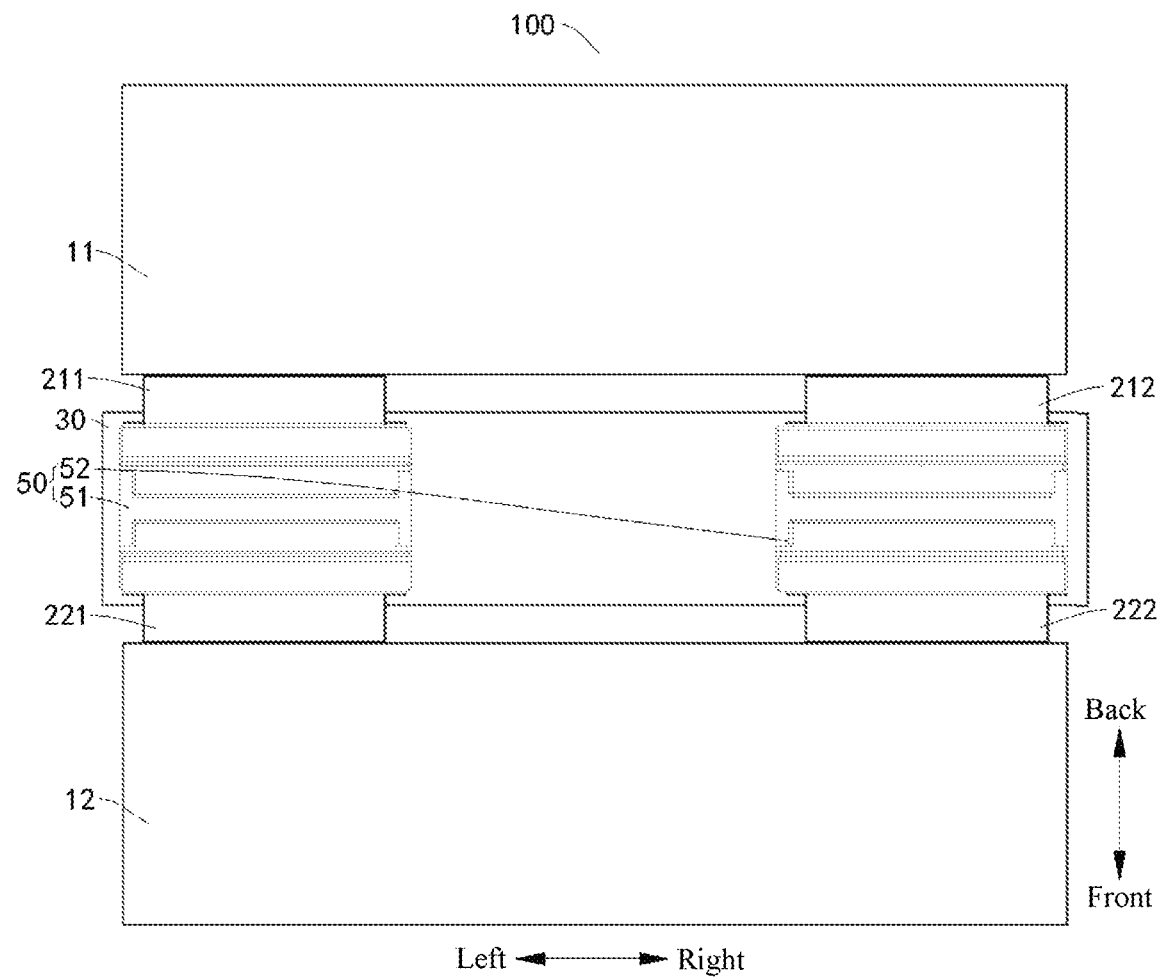
FIG. 4 is a schematic structural diagram of a battery in a state according to an embodiment of the present disclosure.

According to some embodiments of the present disclosure, as shown in FIG. 4, the insulating spacer 50 may be clamped onto the cover plate 30, that is, the insulating spacer 50 may be connected to the cover plate 30 through clamping, the connection of the insulating spacer 50 is simple and reliable, and the insulating spacer 50 cooperates with the cover plate 30 to better prevent deformation of the tab 20.

Figure 9:
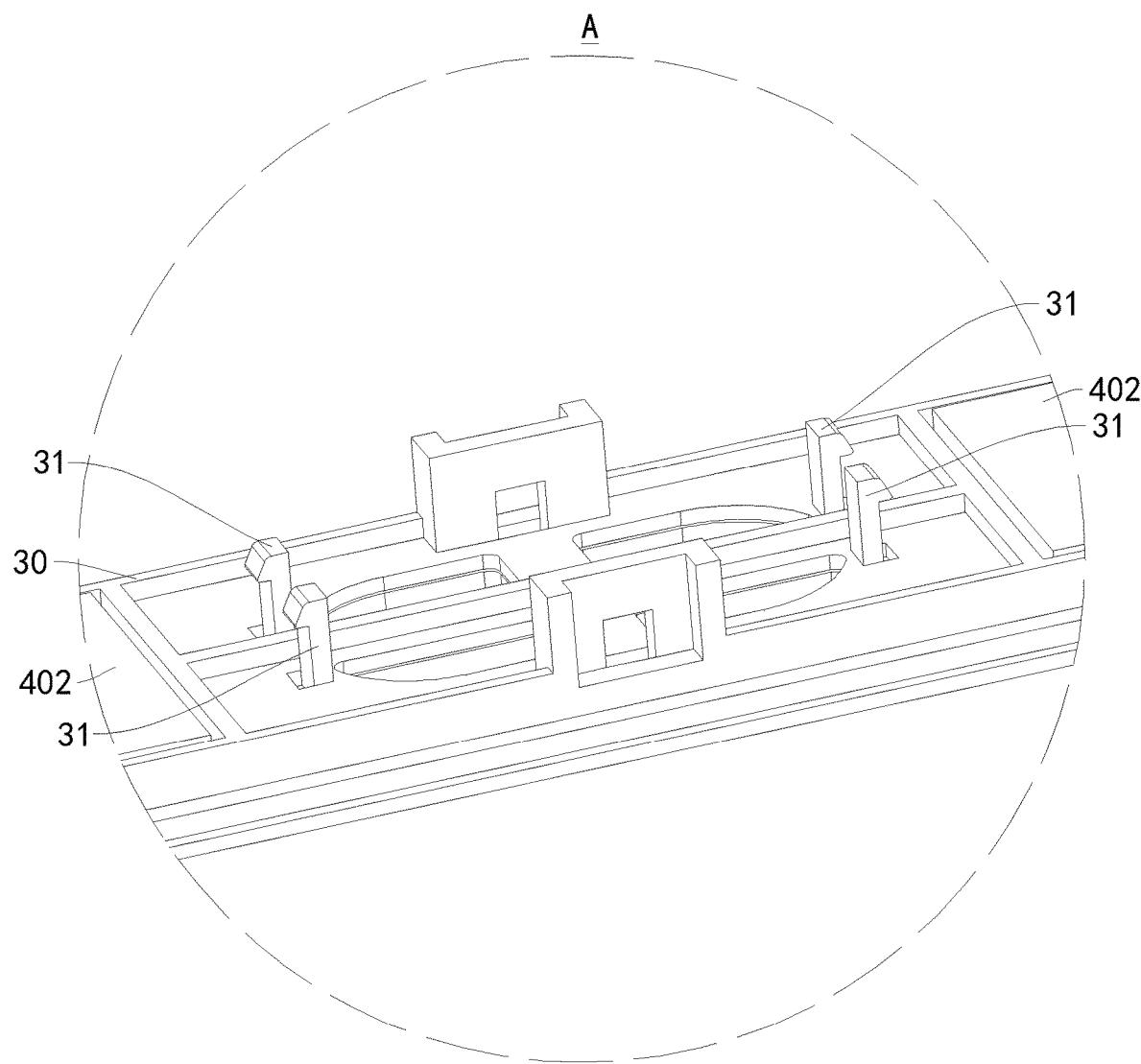
FIG. 9 is an enlarged schematic view of a circle A in FIG. 8.

In some embodiments of the present disclosure, as shown in FIG. 8 and FIG. 9, a surface that is of the cover plate 30 and that faces the insulating spacer 50 may be provided with a hook 31, and the insulating spacer 50 may be clamped with the hook 31 to implement the connection between the insulating spacer 50 and the cover plate 30.

In the present disclosure, a number and a disposing position of the hook 31 are not particularly limited. For example, in specific embodiments shown in FIG. 8 and FIG. 9, each insulating spacer 50 is clamped by four hooks 31, two hooks 31 are respectively clamped on two sides of the insulating spacer 50 along a length direction of the cover plate 30 (a left-right direction shown in FIG. 8), and two hooks 31 on the same side are disposed at an interval of a specified distance. Therefore, the four hooks 31 are generally located at four corners of a quadrangle to fasten the insulating spacer 50, so that the insulating spacer 50 is fastened more firmly.

Herein, a distance between the hooks 31 on the same side may be flexibly set according to an actual situation, and the number of hooks 31 is not limited to four hooks shown in the embodiment of FIG. 8. Certainly, a clamping structure for connecting the insulating spacer 50 to the cover plate 30 is not limited to the hook 31 shown in FIG. 8 and FIG. 9, provided that a requirement that the insulating spacer 50 is connected to the cover plate 30 through clamping is met.

In addition, a surface that is of the insulating spacer 50 and that faces away from the cover plate 30 may be provided with a slot 501, and the hook 31 may be hooked in the slot 501 from the edge of the insulating spacer 40, so that the hook 31 and the insulating spacer 50 can be more firmly and reliably clamped, and a structure design is more reasonable.

According to some embodiments of the present disclosure, the insulating spacer 50 may be formed as a plate-like structure, and the plate-shape structure and the cover plate 30 may be more closely fitted, so that a fastening effect on the tab 20 is better, thereby facilitating the connection between the insulating spacer 50 and the cover plate 30.

Figure 6:
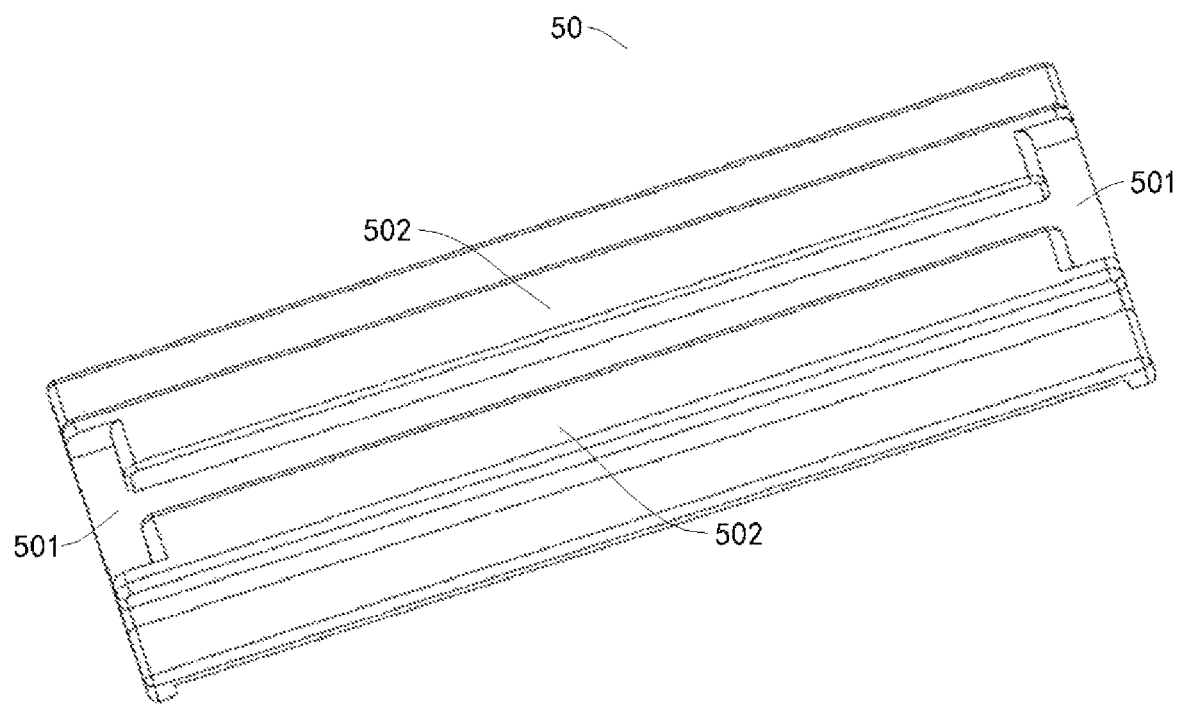
FIG. 6 is a schematic structural diagram of an angle of an insulating spacer of a battery according to an embodiment of the present disclosure.

In some embodiments of the present disclosure, as shown in FIG. 5 and FIG. 6, a side surface that is of the insulating spacer 50 and that faces away from the cover plate 30 may be provided with a reinforcing rib 502 that protrudes toward the pole core 10. The reinforcing rib 502 can enhance strength of the insulating spacer 50 and prevent the insulating spacer 50 from being deformed or broken during use to affect normal use of the battery 100. The entire slot 501 or a part of the slot 501 may be formed on the reinforcing rib 502. In other words, the reinforcing rib 502 may extend to the edge of the insulating spacer 50, and an end of the reinforcing rib 502 may be provided with the slot 501, to ensure that extension length of the reinforcing rib 502 is sufficiently large, and the clamping between the hook 31 and the insulating spacer 50 can be implemented. Therefore, a structure design is more reasonable.

In addition, a side surface that is of the insulating spacer 50 and that faces the cover plate 30 may be provided with a groove 503, to reduce a weight of the insulating spacer 50 and reduce production costs. A position of the groove 503 may correspond to a position of the reinforcing rib 502. In other words, the groove 503 is recessed toward the inside of the reinforcing rib 502, and a number of molds can be reduced during processing, thereby facilitating mold management and simplifying a processing procedure.

Figure 7:
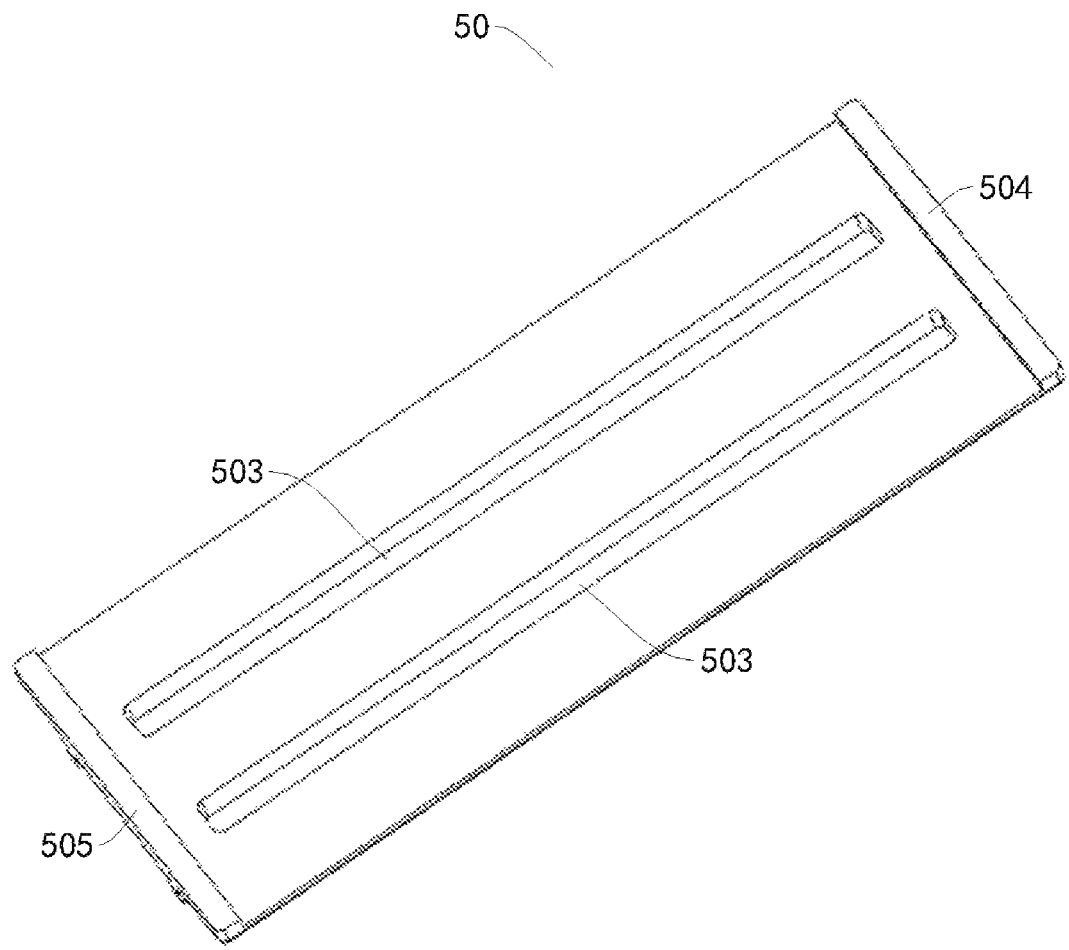
FIG. 7 is a schematic structural diagram of another angle of an insulating spacer of a battery according to an embodiment of the present disclosure.

In some embodiments of the present disclosure, as shown in FIG. 6 and FIG. 7, a plurality of reinforcing ribs 502 disposed in parallel may be included, or a plurality of grooves 503 that are disposed in parallel and that are corresponding to positions of the reinforcing ribs 502 may also be included. According to factors such as a volume and strength of the insulating spacer 50, two, three or more reinforcing ribs 502 and grooves 503 may be respectively included, which are all within the protection scope of the present disclosure.

According to some embodiments of the present disclosure, as shown in FIG. 7, in an extending direction perpendicular to the reinforcing rib 502, a surface that is of the insulating spacer 50 and that faces the cover plate 30 may be provided with a first support rib 504 and a second support rib 505, and the first support rib 504 and the second support rib 505 may be located at two ends of the insulating spacer 50. When the insulating spacer 50 covers the tab 20, the first support rib 504 and the second support rib 505 may be respectively located on two sides of the tab 20 in a width direction of the tab 20 (a left-right direction shown in FIG. 4) and may abut against the cover plate 30, so that strength of an end of the insulating spacer 50 can be enhanced, thereby further enhancing strength of the insulating spacer 50.

In a specific embodiment shown in FIG. 7, two ends of a side surface that is of the insulating spacer 50 and that faces the cover plate 30 are provided with the first support rib 504 and the second support rib 505. When the insulating spacer 50 and the cover plate 30 are clamped by the hook 31, the hook 31 may be clamped at the two ends of the insulating spacer 50, and the first support rib 504 and the second support rib 505 may cooperate with the hook 31 to make the clamping structure more firm and reliable.

In some embodiments of the present disclosure, the insulating spacer 50 may be a rubber piece, the rubber is easy to process and form and has stable physical and chemical properties, and a surface of the rubber piece is flat and has good insulation and high temperature resistance, and therefore it is not easy to damage the tab 20 and other components. For example, in some specific embodiments of the present disclosure, the insulating spacer 50 may be made of PET materials.

In the present disclosure, a thickness of the insulating spacer 50 and a length, a width, a height, and a number of the reinforcing rib 502 on the insulating spacer 50 may be adjusted according to different materials of the insulating spacer 50. Therefore, the insulating spacer 50 meets different strength requirements and is more practical.

Figure 3:
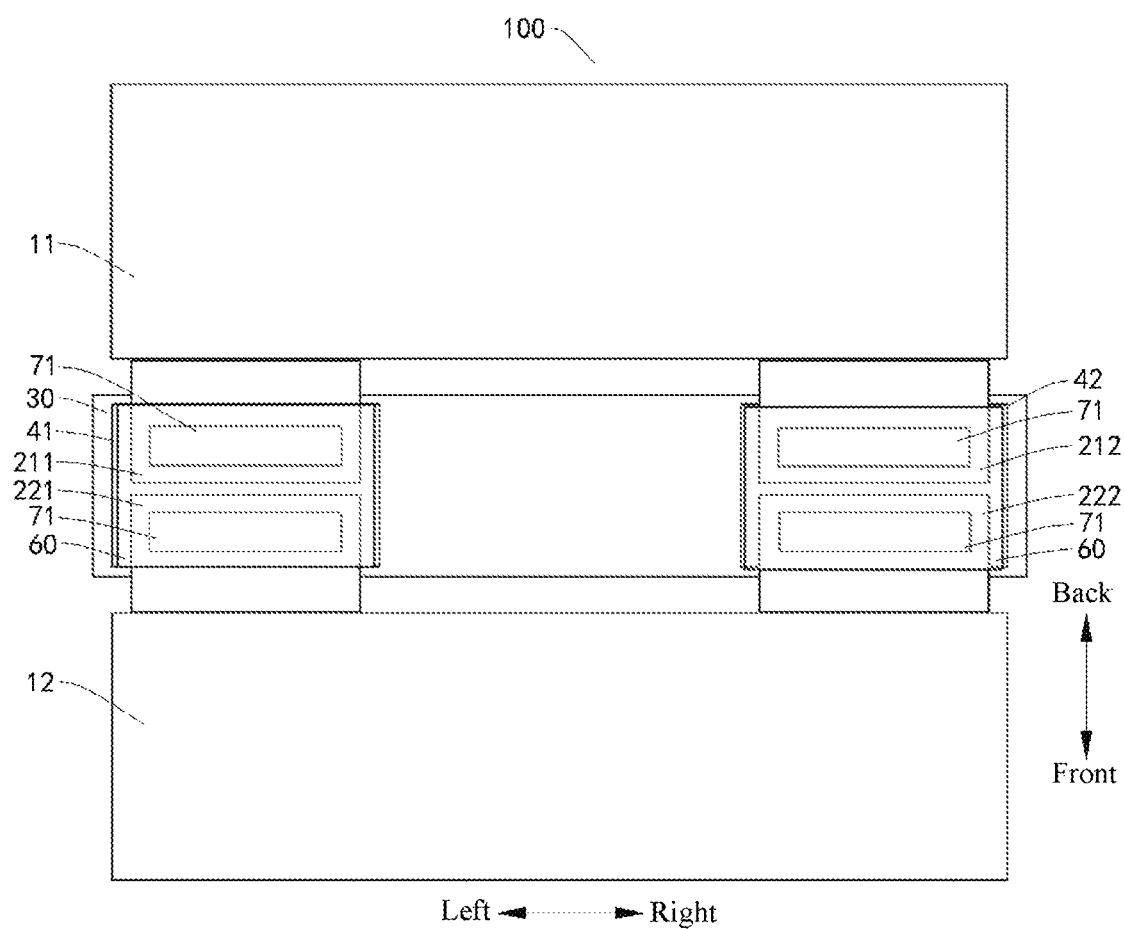
FIG. 3 is a schematic structural diagram of a battery in with an insulating spacer is not included according to an embodiment of the present disclosure.

In some embodiments of the present disclosure, as shown in FIG. 3, a protective adhesive layer 60 may be disposed between the insulating spacer 50 and a junction of the tab 20 and the terminal 40, and the protective adhesive layer 60 may further shield a junction of the tab 20 and the cover plate 30, thereby preventing burrs at the junction from puncturing the tab 20 and other components and making it more safe and reliable.

In some embodiments of the present disclosure, the protective adhesive layer 60 may be an adhesive tape, and the adhesive tape may be pasted and connected to the tab 20. Therefore, a connection manner is simpler, and the bonding is more tight and firm.

In addition, as shown in FIG. 4, in a width direction of the cover plate 30 (a front-back direction shown in FIG. 4), two ends of the terminal 40 may extend beyond the two ends of the insulating spacer 50, that is, a width of the insulating spacer 50 is less than the width of the terminal 40 to prevent the insulating spacer 50 from exceeding an end of the battery 100, and therefore the battery 100 has a more neat structure.

In a length direction of the cover plate 30 (a left-right direction shown in FIG. 4), the two ends of the insulating spacer 50 may extend beyond two ends of the tab 20, that is, a length of the insulating spacer 50 is greater than a width of the tab 20, to ensure that the insulating spacer 50 can completely cover the tab 20, which can effectively prevent deformation of the tab 20 and has a better fastening effect.

In the embodiment including the protective adhesive layer 60, as shown in FIG. 3, in the width direction of the cover plate 30 (a front-back direction shown in FIG. 3), the two ends of the terminal 40 may extend beyond two ends of the protective adhesive layer 60, that is, a width of the protective adhesive layer 60 is less than the width of the terminal 40, to ensure that the protective adhesive layer 60 can completely cover a region of the terminal 40 to prevent an edge of the protective adhesive layer 60 from curling or cracking and affecting a coverage effect. In addition, in the length direction of the cover plate 30 (a left-right direction shown in FIG. 3), the two ends of the protective adhesive layer 60 may extend beyond the two ends of the tab 20, that is, a length of the protective adhesive layer 60 is less than a length of the tab 40 and greater than the width of the tab 20, to ensure that the protective adhesive layer 60 can completely cover the tab 20 and a coverage effect on the tab 20 is better.

According to some embodiments of the present disclosure, the cover plate 30 may have a first side region 301 and a second side region 302, and the first side region 301 and the second side region 302 may be arranged along a lateral direction of the cover plate 30. Herein, the lateral direction of the cover plate 30 may be understood as a front-back direction shown in FIG. 2, that is, the width direction of the cover plate 30.

It can be understood by those skilled in the art that the first side region 301 and the second side region 302 are both spatial regions. In other words, one part of the cover plate 30 is referred to as the first side region 301, and another part of the cover plate 30 is referred to as the second side region 302.

The terminal 40 may be disposed on the cover plate 30, one part of the terminal 40 may be located in the first side region 301, and the another part of the terminal 40 may be located in the second side region 302. In other words, the terminal 40 spans the first side region 301 and the second side region 302 of the cover plate 30.

In some embodiments of the present disclosure, a number of pole cores 10 is not particularly limited, and two or more pole cores 10 may be included. A plurality of pole cores 10 may be connected in parallel or in series, so that the battery 100 can have a larger capacity or a higher voltage to meet more use requirements. Two adjacent pole cores 10 in the plurality of pole cores 10 may form one pair, and the two pole cores 10 may be disposed side by side along a width direction of the cover plate 30. The pole core 10 of the battery 100 may include at least one pair of pole cores 10, and each pair of pole cores 10 includes a first pole core 11 and a second pole core 12.

Figure 2:
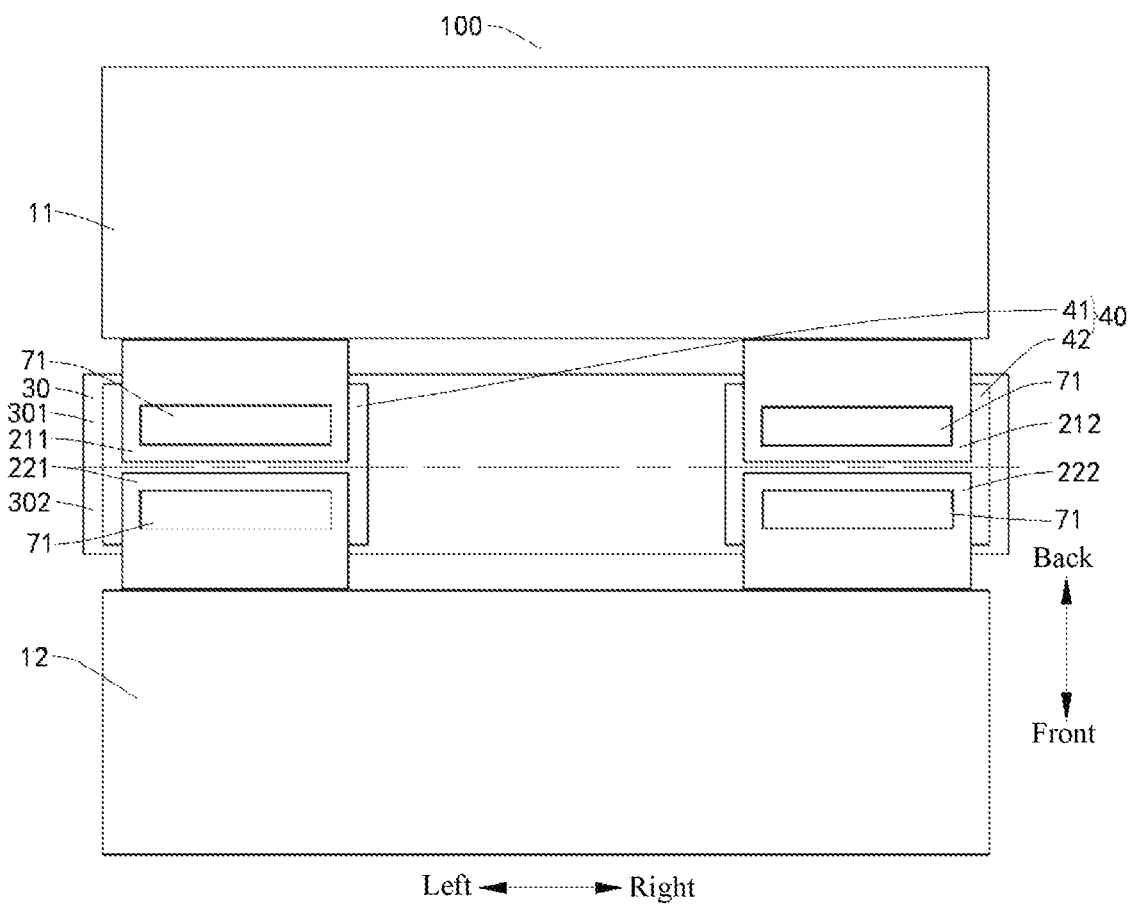
FIG. 2 is a schematic structural diagram of a battery in with an insulating spacer is not included according to an embodiment of the present disclosure.

The first pole core 11 and the second pole core 12 may be located inside the housing. As shown in FIG. 2, the first pole core 11 may correspond to a position of the first side region 301, and the second pole core 12 may correspond to a position of the second side region 302. In addition, the first pole core 11 may have a first tab 21, the first tab 21 may extend along a direction from the first side region 301 to the second side region 302, and the first tab 21 is connected to at least one part of the terminal 40, to implement the connection between the first pole core 11 and the terminal 40. The second pole core 12 may have a second tab 22, the second tab 22 may extend along a direction from the second side region 302 to the first side region 301, and the second tab 22 is connected to at least another part of the terminal 40, to implement the connection between the second pole core 12 and the terminal 40.

It should be noted that the first tab 21 may partially extend along the direction from the first side region 301 to the second side region 302, or may entirely extend along the direction from the first side region 301 to the second side region 302. The second tab 22 may partially extend along the direction from the second side region 302 to the first side region 301, or may entirely extend along the direction from the second side region 302 to the first side region 301. In other words, at least one part of the first tab 21 may extend along the direction from the first side region 301 to the second side region 302, and at least one part of the second tab 22 may extend along the direction from the second side region 302 to the first side region 301, which are all within the protection scope of the present disclosure.

In addition, at least one insulating spacer 50 in one-to-one correspondence with at least one pair of pole cores 10 may be included, and each insulating spacer 50 may simultaneously cover one side that is of a junction of the first tab 21 of the corresponding pair of pole cores 10 and the terminal 40 and that faces away from the terminal 40 and one side that is of a junction of the second tab 22 and that faces away from the terminal 40. In other words, when a plurality of pairs of pole cores 10 are included, one insulating spacer 50 may be included, and the one insulating spacer 50 may correspond to one pair of pole cores 10 in the plurality of pairs of pole cores 10, or a plurality of insulating spacers 50 may be included, and the plurality of insulating spacers 50 may be disposed in one-to-one correspondence with the plurality of pairs of the pole cores 10.

According to some embodiments of the present disclosure, as shown in FIG. 1 to FIG. 4, the first pole core 11 may include two first tabs 21: a first positive tab 211 and a first negative tab 212, and the second pole core 12 may include two second tabs 22: a second positive tab 221 and a second negative tab 222. The first positive tab 211 and the first negative tab 212 may be disposed at intervals along a length direction of the first pole core 11, that is, a length direction of the cover plate 30, and the second positive tab 221 and the second negative tab 222 may be disposed at intervals along a length direction of the second pole core 12, that is, the length direction of the cover plate 30.

The terminal 40 may include a positive terminal 41 and a negative terminal 42. The first positive tab 211 and the second positive tab 221 may be connected to the positive terminal 41, and the first negative tab 212 and the second negative tab 222 may be connected to the negative terminal 42. Therefore, both a positive connection sheet for connecting a positive tab to a positive terminal in the related art and a negative connection sheet for connecting a negative tab to a negative terminal in the related art are omitted, thereby further simplifying an assembly procedure, reducing production costs, and reducing internal resistance of the battery 100.

In addition, as shown in FIG. 3, one side that is of a connection part of the first positive tab 211 and the positive terminal 41 and that faces away from the positive terminal 41 and one side that is of a connection part of the second positive tab 221 and the positive terminal 41 and that faces away from the positive terminal 41 may be provided with one insulating spacer 50, which is referred to as a positive insulating spacer 51; or one side that is of a connection part of the first negative tab 212 and the negative terminal 42 and that faces away from the negative terminal 42 and one side that is of a connection part of the second negative tab 222 and the negative terminal 42 and that faces away from the negative terminal 42 may be provided with one insulating spacer 50, which is referred to as a negative insulating spacer 52.

When the first positive tab 211 and the second positive tab 221 and the first negative tab 212 and the second negative tab 222 are provided with insulating spacers 50 on sides facing away from the cover plate 30, in some embodiments of the present disclosure, the positive insulating spacer 51 and the negative insulating spacer 52 may be disposed at intervals, that is, disposed independently, thereby facilitates mounting of other components and saving raw materials. Certainly, the positive insulating spacer 51 and the negative insulating spacer 52 may also extend toward each other to be connected as an integrated piece, thereby reducing a number of parts and reducing an assembly procedure.

In some embodiments of the present disclosure, the battery 100 according to the embodiments of the present disclosure may be a lithium-ion battery or the like, which are all within the protection scope of the present disclosure.

The battery 100 in a specific embodiment of the present disclosure is described in detail below with reference to the accompanying drawings. It should be noted that the following description is only an exemplary description and cannot be understood as a limitation to the utility model.

As shown in FIG. 1 to FIG. 5, the battery 100 includes a first pole core 11, a second pole core 12, a first positive tab 211, a first negative tab 212, a second positive tab 221, a second negative tab 222, a cover plate 30, a positive terminal 41, a negative terminal 42, a positive insulating spacer 51, a negative insulating spacer 52, and two protective adhesive layers 60.

An assembly process of the battery 100 is as follows.

First, the first positive tab 211 and the second positive tab 221 are laminated together by a plurality of layers of aluminum foils after being wound or laminated, and the first negative tab 212 and the second negative tab 222 are laminated together by a plurality of layers of copper foils. The protective sheet 70 is respectively added to the first positive tab 211, the second positive tab 221, the first negative tab 212, and the second negative tab 222, so that left and right positions of the protective sheet 70 are centered. The first positive tab 211, the second positive tab 221, the first negative tab 212, and the second negative tab 222 are respectively pre-welding through ultrasonic welding, and a pre-welding region 71 of the ultrasonic welding is located in the center of the protective sheet 70.

The plate-like body 402 of the positive terminal 41 and the plate-like body 402 of the negative terminal 42 on the cover plate 30 are both platform structures. The platform is slightly higher than a side surface that is of the cover plate 30 and that faces the first pole core 11 and the second pole core 21. The pre-welding first pole core 11 and second pole core 12 are respectively located on two sides of the cover plate 30 along a width direction of the cover plate 30. The first positive tab 211 and the first negative tab 212 are distributed along a length direction of the cover plate 30, and the second positive tab 221 and the second negative tab 222 are also distributed along the length direction of the cover plate 30. The first positive tab 211 and the second positive tab 221 are aligned along a center line of a length direction of the cover plate 30, the first negative tab 212 and the second negative tab 222 are aligned along the center line of the length direction of the cover plate 30, and the protective sheet 70 is at a specified distance from a platform edge of the terminal 40.

The first positive tab 211 and the second positive tab 221 are disposed at an interval of a specified distance on two sides of a center line of the positive terminal 41, and the first negative tab 212 and the second negative tab 222 are disposed at an interval of a specified distance on two sides of a center line of the negative terminal 42. The pre-welding tab 20 is connected to the mounting plane 401 of the plate-like body 402 of the terminal 40 through laser welding. A junction of the laser welding is on the pre-welding region 71 of the ultrasonic pre-welding, to ensure that the connection between the tab 20 and the cover plate 30 is firm, as shown in FIG. 2.

Subsequently, as shown in FIG. 3, the protective glue layer 60 is pasted at a junction of the first positive tab 211 and the second positive tab 221, and the protective glue layer 60 is pasted at a junction of the first negative tab 212 and the second negative tab 222. In a width direction of the cover plate 30, a width of the protective adhesive layer 60 is slightly less than the plate-like body 402 of the terminal 40 on the cover plate 30. In a length direction of the cover plate 30, a length of the protective adhesive layer 60 is greater than a width of the tab 20.

Then, as shown in FIG. 4, the positive insulating spacer 51 and the negative insulating spacer 52 are placed on the two protective adhesive layers 60 respectively, and are respectively clamped with the hook 31 on the cover plate 30. A width of the insulating spacer 50 is slightly less than a width of the plate-like body 402 of the terminal 40, and a length of the insulating spacer 50 is greater than a length of the plate-like body 402 of the terminal 40.

Finally, the tab 20 is bent, so that the first pole core 11 and the second pole core 12 are combined to form the battery 100. As shown in FIG. 5, after the bending, a distance between a mounting portion 202 and a bending portion 201 of the tab 20 corresponds to a thickness of the insulating spacer 50, thereby avoiding wasting of space. The battery 100 is assembled.

The battery pack according to the embodiments of the present disclosure includes the battery 100 according to the embodiments of the present disclosure. Because the battery 100 according to the embodiments of the present disclosure has the foregoing beneficial technical effects, the battery pack according to the embodiments of the present disclosure can effectively prevent deformation or damage of the tab 20, is more safe and reliable, and is beneficial to improvement of market competitiveness.

The electric vehicle according to the embodiments of the present disclosure includes the battery pack according to the embodiments of the present disclosure. Because the battery pack according to the embodiments of the present disclosure has the foregoing beneficial technical effects, the electric vehicle according to the embodiments of the present disclosure can effectively prevent deformation or damage of the tab 20, is more safe and reliable, and is beneficial to improvement of market competitiveness.

Other configurations and operations of the battery 100, the battery pack, and the electric vehicle according to the embodiments of the present disclosure are known to those of ordinary skill in the art, and are not described in detail herein.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in the present disclosure according to specific situations.

In description of the present disclosure, description of reference terms such as "an embodiment", "specific embodiments", or "an example", means including specific features, structures, materials, or features described in the embodiment or example in at least one embodiment or example of the present disclosure. In this specification, schematic descriptions of the foregoing terms do not necessarily directed at a same embodiment or example. Moreover, the specific features, structures, materials, or characteristics described may be combined with each other in any one or more embodiments or examples in an appropriate manner without interference or contradiction.

What is claimed is:

1. A battery, comprising:
   a housing;
   a cover plate located at an end of the housing;
   a terminal disposed on the cover plate;
   a pole core located inside the housing and having a tab, the tab having a bending portion and a mounting portion, a socket being formed between the bending portion and the mounting portion, and the mounting portion being connected to the terminal; and
   an insulating spacer covering at least one part of the tab that faces away from the terminal, wherein at least one part of the insulating spacer is located in the socket.

2. The battery according to claim 1, wherein a surface that is of the terminal and that faces the pole core constitutes a mounting plane, and the mounting portion being parallel to the mounting plane and connected to the mounting plane, and the insulating spacer coveting the mounting portion and an edge of the insulating spacer being located at a junction of the mounting portion and the bending portion.

3. The battery according to claim 2, wherein the terminal comprises:
   a plate-like body disposed on a surface that is of the cover plate and that faces the pole core, a surface that is of the plate-like body and that faces the pole core constituting the mounting plane; and
   a columnar body connected to the plate-like body and passing through the cover plate to protrude from a surface that is of the cover plate and that faces away from the pole core.

4. The battery according to claim 3, wherein
   the plate-like body and the columnar body are an integrated piece; or
   the plate-like body and the columnar body are separate pieces.

5. The battery according to claim 1, wherein the insulating spacer is clamped onto the cover plate.

6. The battery according to claim 5, wherein a surface that is of the cover plate and that faces the insulating spacer is provided with a hook, and a surface that is of the insulating spacer and that faces away from the cover plate is provided with a slot, the hook being hooked in the slot from an edge of the insulating spacer.

7. The battery according to claim 6, wherein the surface that is of the insulating spacer and that faces away from the cover plate is provided with a reinforcing rib protruding toward the pole core, at least one part of the slot being formed on the reinforcing rib.

8. The battery according to claim 7, wherein a surface that is of the insulating spacer and that faces the cover plate is provided with a groove recessed into awl inside of the reinforcing rib.

9. The battery according to claim 1, wherein a surface that is of the insulating spacer and that faces the cover plate is provided with a first support rib and a second support rib, and the first support rib and the second support rib are respectively located on two sides of the tab in a width direction of the tab and both of the first support rib and the second support rib abut against the cover plate.

10. The battery according to claim 1, wherein a protective adhesive layer is disposed between the insulating spacer and the at least one part of the tab.

11. The battery according to claim 10, wherein
    a width of the protective adhesive layer is less than a width of the terminal, and a length of the protective adhesive layer is less than a length of the terminal and greater than a width of the tab; and
    a width of the insulating spacer is less than the width of the terminal, and a length of the insulating spacer is greater than the width of the tab.

12. The battery according to claim 1, wherein
    the cover plate has a first side region and a second side region arranged along a lateral direction of the cover plate, a first part of the terminal being located in the first side region and a second part, of the terminal being located in the second side region;
    the battery comprises at least one pair of pole cores, and each pair of pole cores comprises a first pole core corresponding to a position of the first side region and a second pole core corresponding to a position of the second side region, the first pole core having a first tab, at least one part of the first tab extending in a direction from the first side region to the second side region and being connected to at least the first part of the terminal, the second pole core having a second pole tab, and at least one part of the second tab extending in a direction from the second side region to the first side region and being connected to at least the second part of the terminal; and
    the insulating spacer covers one side that is of the at least one part of the first tab and that faces away from the terminal and one side that is of the at least one part of the second tab and that faces away from the terminal.

13. The battery according to claim 12, wherein
    the first pole core has a first positive tab and a first negative tab disposed at a first interval along a length direction of the first pole core, the second pole core has a second positive tab and a second negative tab disposed at a second interval along a length direction of the second pole core the terminal is a positive terminal and the battery further comprises a negative terminal, at least one part of the first positive tab and at least one part of the second positive tab being connected to the positive terminal, and at least one part of the first negative tab and at least one part of the second negative tab being connected to the negative terminal; and
    the insulating spacer is a positive insulating spacer and the battery further comprises a negative insulating spacer, the positive insulating spacer covering at least one part of the first positive tab that faces away from the positive terminal and at least one part of the second positive tab that faces away from the positive terminal, and the negative insulating spacer covering at least one part of the first negative tab that faces away from the negative terminal and at least one part of the second negative tab that faces away from the negative terminal.

14. The battery according to claim 13, wherein the positive insulating spacer and the negative insulating spacer are disposed at a third interval or extend toward each other to be connected into one piece.

15. A battery pack, comprising the battery according to claim 1.

16. An electric vehicle, comprising the battery pack according to claim 15.

* * * * *

UNITED STATES PATENT AND TRADEMARK OFFICE
CERTIFICATE OF CORRECTION

PATENT NO. : 11,522,255 B2
APPLICATION NO. : 16/772440
DATED : December 6, 2022
INVENTOR(S) : Yanchu Liu et al.

It is certified that error appears in the above-identified patent and that said Letters Patent is hereby corrected as shown below:

In the Claims

In Claim 8, Column 14, Line 5, "recessed into awl inside" should read -- recessed into an inside --

Signed and Sealed this
Twelfth Day of September, 2023

Katherine Kelly Vidal
*Director of the United States Patent and Trademark Office*